United States Patent [19]

Frankel et al.

[11] 4,026,469
[45] May 31, 1977

[54] APPARATUS FOR SPRAYING BUSHES AND TREES

[75] Inventors: Harry Frankel, Savyon; Haim Levit, Sde - Varbourg; David Nahir, Bat-Yam, all of Israel

[73] Assignee: The State of Israel, Ministry of Agriculture, Jerusalem, Israel

[22] Filed: Feb. 26, 1975

[21] Appl. No.: 553,076

[30] Foreign Application Priority Data

Feb. 27, 1974 Israel .................................. 44307

[52] U.S. Cl. ................................ 239/78; 239/380
[51] Int. Cl.² ......................................... B05B 9/06
[58] Field of Search ....................... 239/77, 78, 380

[56] References Cited

UNITED STATES PATENTS

| | | |
|---|---|---|
| 2,321,792 | 6/1943 | Bowie ............................. 239/77 |
| 2,643,155 | 6/1953 | Wright et al. ................... 239/78 |
| 3,067,541 | 12/1962 | Smith ............................. 239/77 |
| 3,069,091 | 12/1962 | Giesse et al. ................... 239/77 |
| 3,088,676 | 5/1963 | Nottingham ..................... 239/78 |
| 3,164,324 | 1/1965 | Bruinsma ........................ 239/77 |
| 3,361,352 | 1/1968 | Harris ......................... 239/380 X |
| 3,489,351 | 1/1970 | Patterson ....................... 239/77 |

*Primary Examiner*—Joseph F. Peters, Jr.
*Assistant Examiner*—Gene A. Church
*Attorney, Agent, or Firm*—Donald M. Sandler

[57] ABSTRACT

Apparatus for spraying trees and especially citrus trees comprising a mobile source of pressurized air adapted to be propelled along a path parallel to a row of trees to be sprayed; at least one nozzle connected to the source and having a throat in the form of a vertically oriented slip producing a sheet-like air blast whose principle plane is substantially vertically oriented; means associated with the list of oscillating the principle plane of the air blast about a substantially vertical axis through such an angle and at such a frequency as to impart an oscillatory movement to the leaf structure within the air blast thereby exposing each surface of the leaves to the blast; and a sprayhead associated with each nozzle out of the path of the air blast for spraying atomized liquid into the air blast at a location downstream of the throat.

21 Claims, 6 Drawing Figures

APPARATUS FOR SPRAYING BUSHES AND TREES

This invention relates to apparatus for spraying bushes and trees, especially citrus trees, in order to control diseases and pests such as scale insects.

The control of scale insects in citrus trees was formerly achieved by a fumigation process involving the injection of cyanide gas into a tent enclosing the tree. This dangerous and expensive method of control has recently been superseded by spraying an emulsion of mineral oil and water into the foliage of the trees in order to coat all of the branches, fruit and leaves with a thin film of oil that eventually smothers the scale without harming the tree or its fruit. Conventionally, the emulsion is formed in large tanks, pressurized by a suitable pump, and fed by hoses to spray heads which are either hand-held or tractor drawn. Hand spraying is very expensive in terms of the number of men hours per tree, but can be very effective depending on the skill of the operator. Mobile spray heads are less expensive in terms of man power, but are also less effective in terms of coverage since the outer shell of foliage deflects under the impact of the spray forming a shield that protects the inner leaf structure of the tree from the spray. Furthermore, the volume of liquid used per unit area of orchard is quite high. For example, it is not unusual to use about 2,000 liters of emulsion per dunam of orchard. The logistics of spraying a large tract of trees is thus considerable, adding to the time, complexity, and expense of spraying which may have to be carried out several times during the growing season.

It is therefore an object of the present invention to provide a new and improved apparatus for spraying bushes and trees which eliminates the above described disadvantages and provides the advantages set out below.

According to the present invention there is provided apparatus for spraying trees and especially citrus trees comprising a mobile source of pressurized air adapted to be propelled along a path parallel to a row of trees to be sprayed; at least one nozzle connected to the source and having a throat in the form of a vertically oriented slit producing a sheet-like air blast whose principle plane is substantially vertically oriented; means associated with the slit for oscillating the principle plane of the air blast a substantially vertical axis through such an angle and at such a frequency as to impart an oscillatory movement to the leaf structure within the air blast thereby exposing each surface of the leaves to the blast; and a sprayhead associated with each nozzle out of the path of the air blast for spraying atomized liquid into the air blast at a location downstream of the throat.

Nutating the air blast and injecting the atomized spray thereinto, not only optimizes the amount of liquid required in carrying out both run-off or film spraying (i.e., spraying to produce a uniform film of liquid on the target) and low or ultra-low volume spraying (i.e., spraying to produce a dense cover of discrete droplets of liquid on the target), but also insures uniform coverage deep inside the target (i.e., foliage adjacent the trunk). In conventional systems in which a spray alone is directed into a target, the mass-median-diameter (MMD) of the droplets must be about 600 microns (millionths of a meter) in order for the droplets to have sufficient mass to travel from the sprayer and impacts the target located some distance from the sprayer. In the present invention, the impact of the air blast on the atomized spray reduces the size of any large droplets such that the MMD of the emitted droplets (i.e., those droplets carried by the blast into the target) is in the range 80–120 microns, a 200-1 volumetric reduction in liquid. This result is achieved with an airflow of about 5,000 C.F.M. from a source at about 7 inches of water pressure producing a throat velocity of about 55 m/sec. The reduced size of the emitted droplets results in greater surface coverage using less liquid. For example, in film spraying citrus trees with an oil emulsion, about a ten-fold reduction of liquid per unit area of orchard is achieved over conventional film spraying, while a thousand-fold reduction is achieved in low or ultra-low volume spraying of deciduous trees with a pesticide solution.

Despite the size of the emitted droplets, deep target coverage is achieved by reason of the nutation of the air blast. Such nutation sets up a resonant oscillation in the branch structure of the target such that both surfaces of each leaf are alternatingly exposed to a blast of air containing the fine droplets of liquid enabling their deposition on such surfaces. Furthermore, the forced oscillation of the leaves prevents the formation of a static shield of leaves as in the case of a conventional spray allowing the blast to penetrate deeply into the interior of the foliage of the target. Therefore, the leaves adjacent the trunk in the inner core of the branch structure will be completely coated with the liquid.

The nutation angle and frequency are inter-related with the speed of travel relative to the target as well as the type of spraying being carried out. In film spraying citrus trees, it has been found that for a travel speed of 1.5 km/hr., a nutation angle (included) between 50°–60° and a nutation frequency of about 60 Hz, about 800–1000 liters/hour of liquid are consumed. In discrete droplet spraying of deciduous trees with a solution of pesticide, it has been found that for a travel speed of 3.5 to 4 km/hr., a nutation angle between 30°–40° and a nutation frequency of about 120 Hz, about 90–500 liters/hour of liquid are consumed.

In addition to a reduction in the liquid required for spraying, the deep penetration of this spray into the core region of the branch structure of the trees greatly increases the efficiency of spraying over that achieved with conventional spraying techniques. The term "tree" is used herein to include both trees as commonly defined, and bushes. In the case of bushes, which have limited elevation, a single nozzle is sufficient to provide the required target coverage. In the case of trees, as commonly defined, their elevation is such that a plurality of nozzles are required, preferably three arranged vertically.

An embodiment of the invention is illustrated by way of example in the accompanying drawings wherein:

FIG. 6 is a horizontal section through a modified version of the apparatus.

Figure 1:
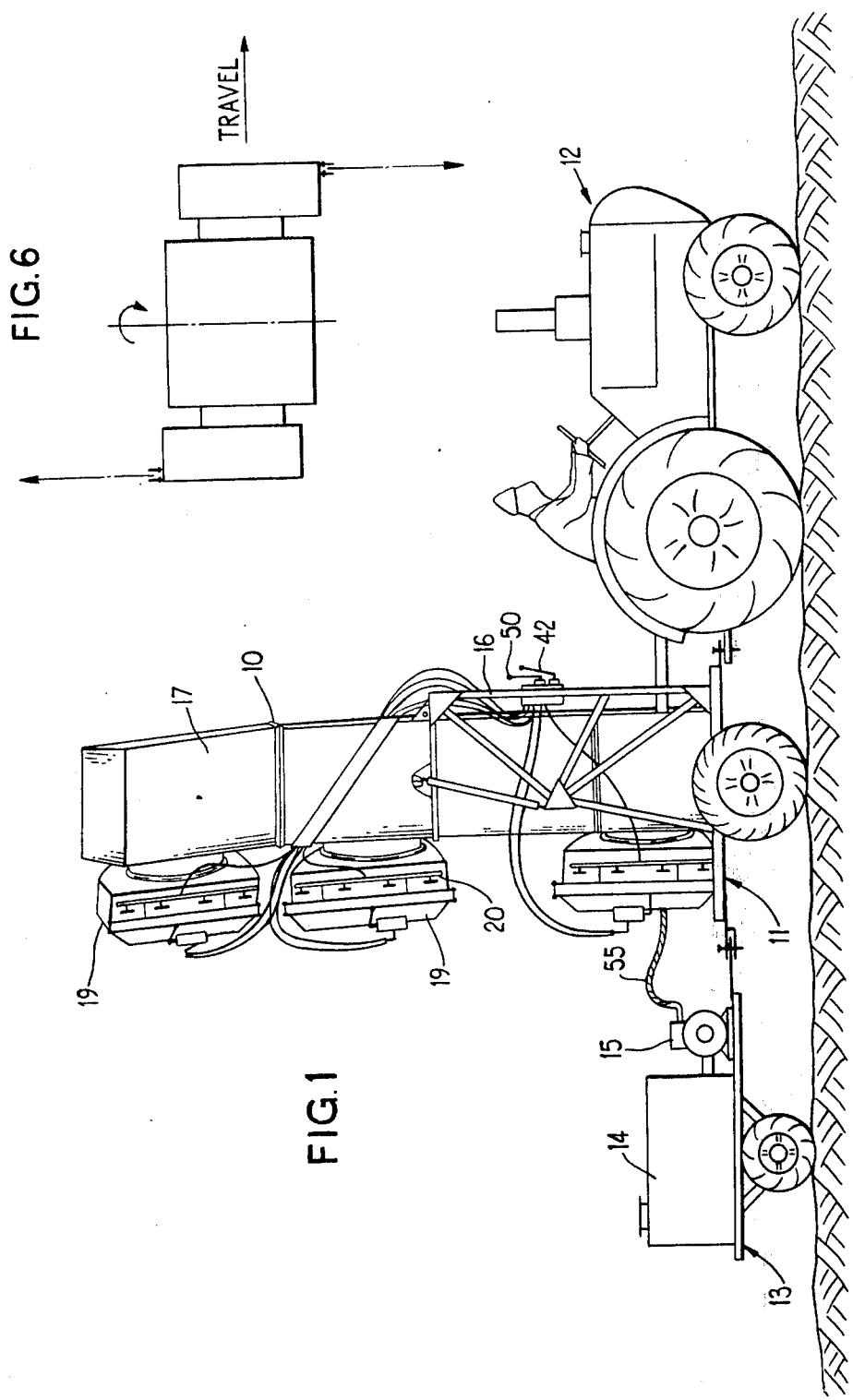
FIG. 1 is a side elevation of the apparatus according to the present invention and shows the apparatus mounted on wheels and being towed by a tractor.

Referring now to FIG. 1, reference numeral 10 designates apparatus according to the present invention mounted on a wheeled chassis 11 hitched to a tractor 12 such that apparatus 10 can be towed by the tractor along a path parallel to and between rows of trees in a fruit orchard. Hitched to the chassis is a trailer 13 carrying a tank 14 of emulsion suitable for use against scale insects, and an independently operated pump 15 by which the emulsion is supplied to the spray heads as described below.

Figure 3:
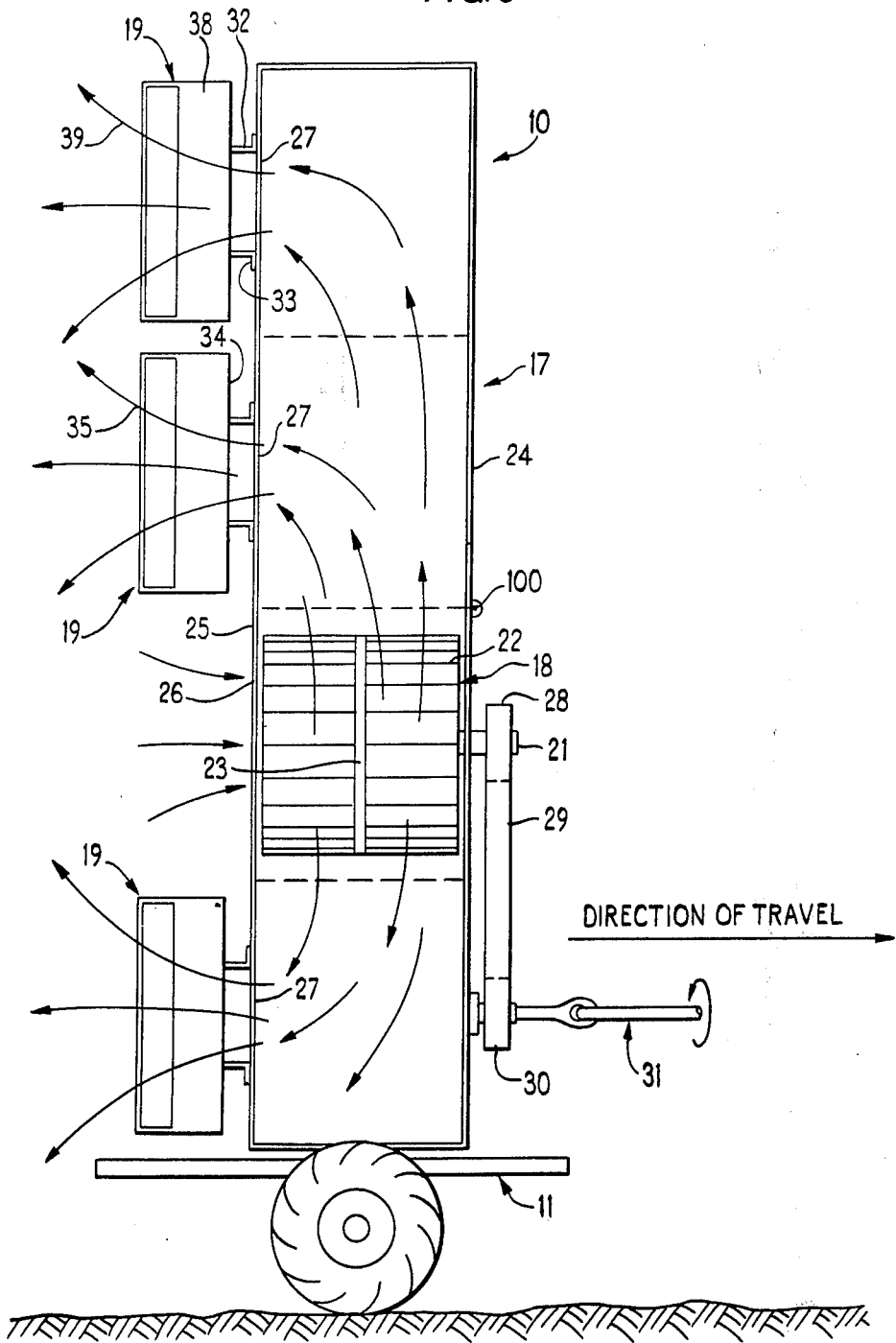
FIG. 3 is a sectional view taken along the lines III—III of FIG. 2.
Figure 4:
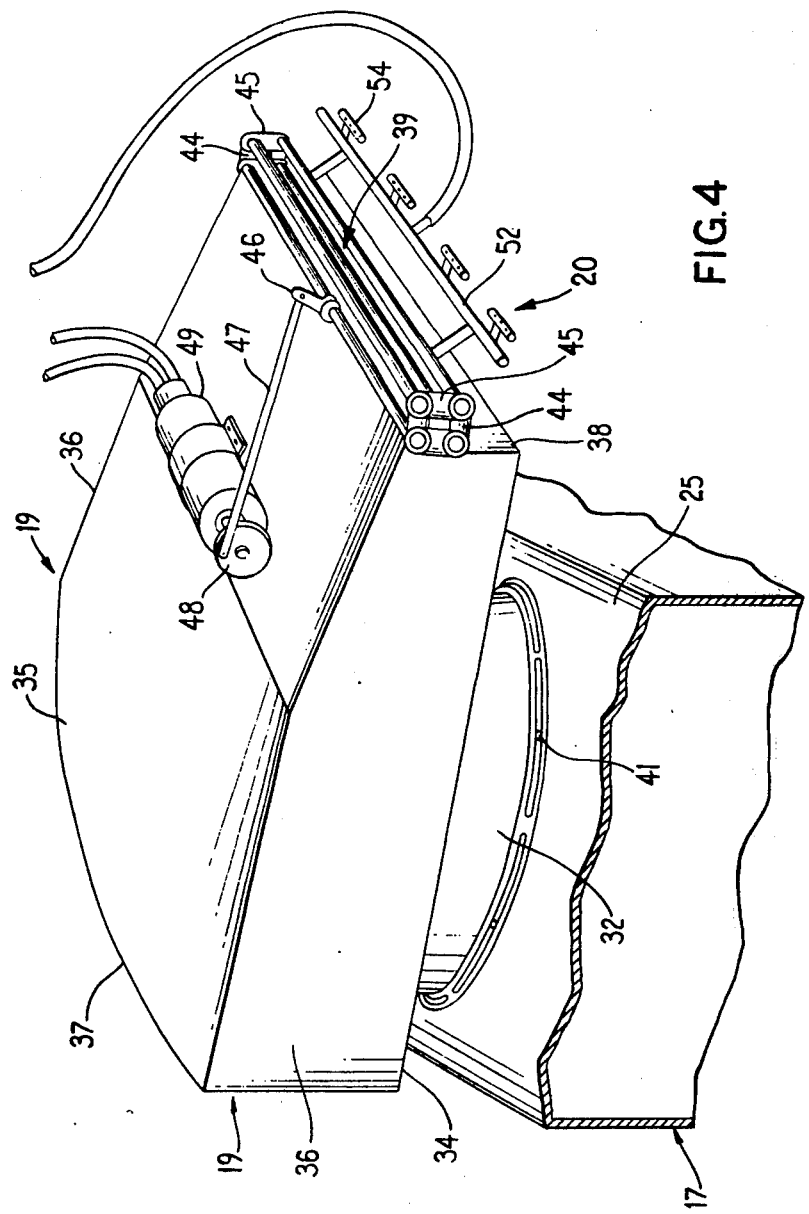
FIG. 4 is a perspective view of one of the nozzles associated with the apparatus showing its articulated throat and the spray head associated therewith.

Apparatus 10 comprises an open frame 16 of angular or tubular construction rigidly connected to the chassis, vertically oriented plenum chamber 17 supported in the frame and containing a centrifugal compressor 18 (see FIG. 3), at least one and preferably three vertically positioned nozzles 19 connected to the chamber, and a sprayhead 20 associated with each nozzle. As seen in FIG. 3, compressor 18 includes a rotor having a drive shaft 21 mounted in bearings carried by the leading and trailing end walls 24 and 25 of chamber 17 (where the terms "leading" and "trailing" refer to the direction of travel of the apparatus), and a plurality of blades 22 connected to discs 23 rigidly attached to the shaft. The leading end wall 24 of the chamber is closed while the trailing end wall 25 is provided with an orifice 26 defining the axial intake to the compressor which is thus located internally of the plenum chamber 17.

Chamber 17 is closed except for the intake orifice 26 and three vertically positioned outlet orifices 27 preferably located in the trailing end wall 25. (In a modification described below, orifices may be provided in both the leading and trailing end walls when it is desirable for the apparatus to achieve the simultaneous spraying of trees to each side of the path traversed through the orchard by the apparatus.) Mounted externally of the chamber 17 on shaft 21 is a pulley 28 operatively engaged with a belt drive 29 which passes in frictional engagement with an idler pulley 30 rotatably mounted on the leading end wall 24 of the plenum chamber. This idler pulley may be driven by a power take-off connection 31 which is part of the accessories associated with tractor 12. Alternatively, the compressor 22 may be driven by an independently powered internal combustion engine mounted on the chassis 11 if this mode of operation is desired.

Figure 2:
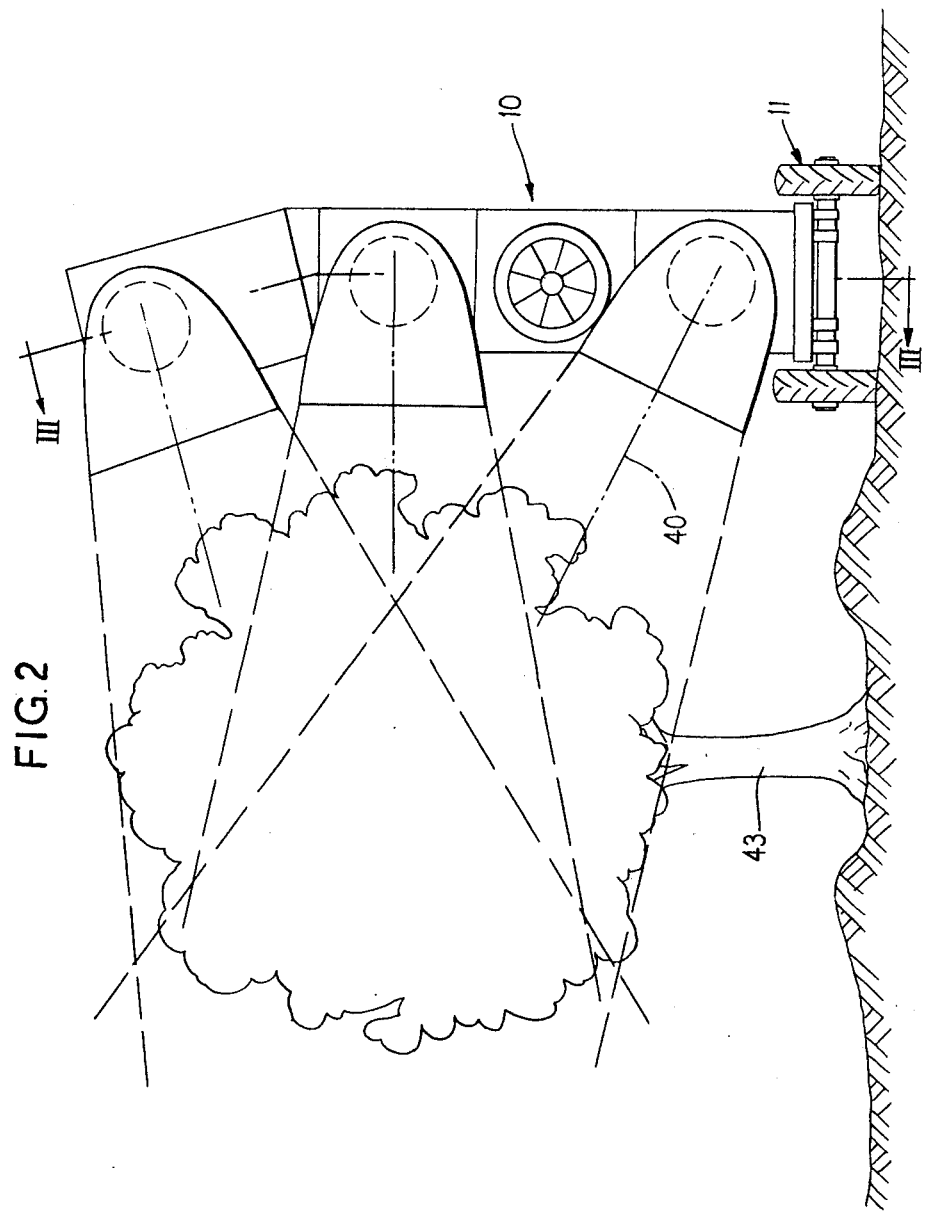
FIG. 2 is a front elevation view of the apparatus according to the present invention as it is actually used to spray a tree.

When pulley 30 is driven by an external source of power, the compressor 22 is rotated at a speed compatable with its design conditions drawing in air through intake orifices 26 and statically pressuring the interior of the plenum chamber. By reason of the use of a plenum chamber, the static air pressure throughout the chamber will be constant such that substantially the same amount of air will pass through each of the exit orifices 27. For reasons to be explained below, the upper third of the plenum chamber 17 may be canted or tilted as indicated in FIG. 2.

Each nozzle 19 is an enlarged box-like chamber having spaced side walls 34 and 35, top and bottom walls 36, a rear wall 37 and a front wall 38 that defines a throat 39 establishing an exit for pressurized air passing into the tubular collar 32 attached to side wall 34. Collar 32 is provided with a slotted flange 33 that is held against the trailing end wall 25 by a plurality of manually adjustable bolts 41 surrounding outlet orifices 27.

Throat 39 of each nozzle amounts to a slit (i.e., the length of the throat is much greater than its transverse dimension) whose principle axis 40 can be selectively oriented with respect to the axis of ring 32 which is positionable at a selected angle on the trailing edge 25 of the chamber 17 by manually adjusting bolts 41. As a consequence, the angular position of axis 40 of each nozzle can be selectively adjusted as shown in FIG. 2 such that the lowermost nozzle is upwardly directed to spray the lower portion of the tree, the middle nozzle is horizontally directed to spray the middle portion of the tree, and the uppermost nozzle is downwardly directed to spray the upper portion of the tree. By canting or tilting the upper third of the plenum chamber, the efficiency of spraying of the upper portion of the trees is improved.

While the angular position of the two lower nozzles are preferably manually adjustable by means of bolt 41, the upper nozzle is preferably provided with means for effecting automatic adjustment of its angular positions during the operation of the apparatus. To this end, the uppermost ring 32 is made freely pivotal on trailing end wall 25, and an hydraulic actuator (not shown) mounted on the frame 16 may be provided for controlling the particular angular position of the upper nozzle. Such actuator may be operated by means of controls mounted on frame 16.

By reason of the orientation of nozzles 19, each produces a sheet-like blast of air whose principle plane is substantially perpendicular to the direction of travel and is thus vertically oriented. When chassis 11 is moved in a direction parallel to a row of trees 43 (see FIG. 2), the sheet-like blast of air from a nozzle progresses through the foliage of the tree from one side to the other exposing all of the foliage to the blast. To prevent such blast from merely deflecting the leaf configuration of the outer periphery of the tree and thus shielding the inner core of foliage from the air blast, the latter is nutated about an axis perpendicular to the principle axis 40 and lying in the throat. Essentially the nutation axis is vertically oriented and perpendicular to the direction of travel (see FIG. 5).

Figure 5:
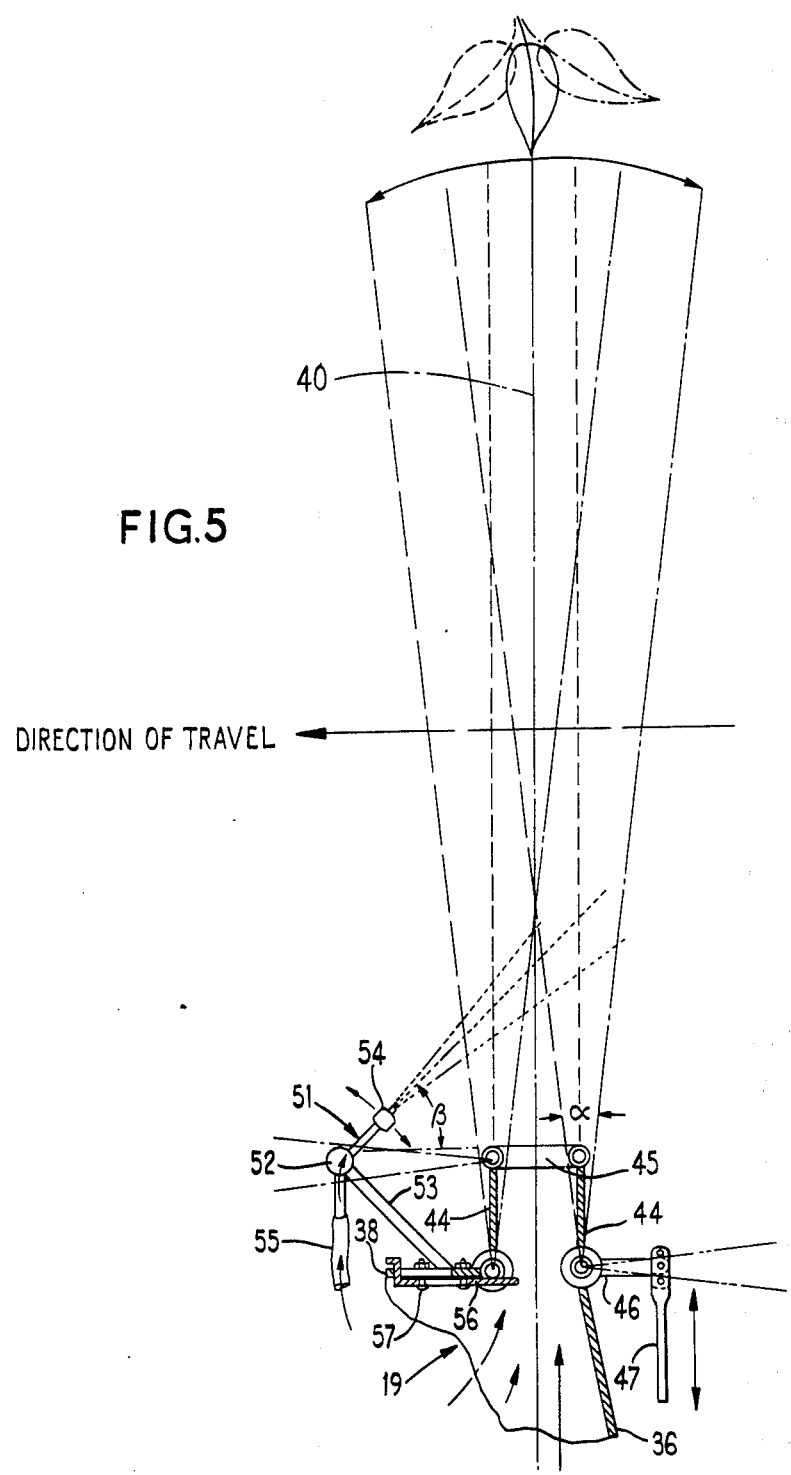
FIG. 5 is a sectional view of the throat of a nozzle showing how the articulated flaps produce a nutation of the air blast produced by the nozzles.

Nutation is achieved by providing on each nozzle, a pair of flaps 44 that are respectively hinged to the nozzles at the edges of walls 36 and 38 as shown in FIG. 5. The free ends of the flaps are pivotally connected by links 45 so that pivotal movement imparted to one flap is transferred to the other flap, and both flaps remain parallel and move in unison. To the flap hinged to wall 36 is rigidly fixed a crank arm 46 that is oscillatable by means of a rigid link 47 eccentrically connected to a disc 48 carried by the output shaft of an hydraulic motor 49 mounted on wall 36 of the nozzle. Motor 49 is supplied with hydraulic fluid through flexible tubing and is operated by controls 50 mounted on frames 16. The pump for the hydraulic fluid is operated by power take-off unit 31, or by an independently operated internal combustion engine mounted on the chassis.

The linkage between motor 49 and flaps 44 is such that the air blast is nutated through a suitable included angle $\alpha$ with respect to the principle axis 40 and at a rate that depends on the setting of control 50. Such rate depends essentially on the species of fruit tree being sprayed, the rate at which the apparatus travels and whether film or discrete droplet spraying is involved as discussed below. By proper selection of the nutation angle and the nutation frequency, a resonant oscillation can be induced in the leaf configuration of a tree as shown in FIG. 5. That is to say, the leaves in the air blast flutter under the impact of the blast rather than being deflected in one direction preventing the leaves from forming a shield for the inner core of foliage in the tree. The resultant oscillation movement of the leaf structure effects a deep penetration of the blast into the core of the leaf configuration exposing both sides of each leaf in the tree to the air blast.

Finally, sprayhead 20 is associated with each nozzle but out of the path of the air blast therefrom for spraying an atomized emulsion of oil and water into the air blast at a location downstream of the throat and to the leading side of the blast as defined by the direction of travel (see FIG. 5). Sprayhead 20 comprises a header tube 52 extending in the direction of the throat 39 parallel to the flaps 44 and overlying the wall 38 to which the tube is rigidly attached by brackets 53. At a plurality of locations of the tube 52 are spray nozzles 54 whose angular position with respect to the axis of the tube can be manually adjusted. As in the case of the frequency and angle of nutation, the angular position of the spray nozzles 54 is a function of the species of fruit tree being sprayed. To furnish liquid from pump 15 to the header 52, flexible conduits 55 are provided.

In operation, as shown in FIG. 1, tractor 12 is driven between the rows of trees in an orchard as the emulsion in tank 14 is pumped into flexible conduits 55 and into the headers 52 associated with each of the nozzles. In addition, the power take-off 31 drives the compressor 18 producing the air blast described above. In addition, a pump (not shown) provides hydraulic fluid to the motors 49 associated with each of the nozzles thereby setting up a nutation in each of the air blasts from the nozzles. The droplets of emulsion sprayed into the air blast, as shown in FIG. 5, are further atomized upon impact with the air blast producing a fine mist that penetrates deeply into the leaf configuration of the tree by reason of the nutation of the air blast. In this manner, both sides of each leaf on the tree as well as all of the fruit and branches thereof are coated with a very fine emulsion of oil and water. The oil portion of the emulsion eventually spreads to cover all of the surface of the leaves, branches and fruit with a very thin film of oil which then smothers any scale insects on the tree. Only a relatively small quantity of emulsion is used because the air blast itself provides the motive power for penetrating into the leaf configuration rather than a high pressure emulsion spray as in the prior art.

Greater flexibility with spraying is achieved for different sizes and types of trees by providing for the throat of each of the nozzles to be adjustable. This modification is shown in FIG. 5 where a blocking plate 56 is shown mounted on the wall 38 of the nozzle such that its free end projects into the throat. Slots are provided in this blocking for cooperation with bolt 57 attached to the wall 38 thereby permitting the throat size to be changed. This arrangement permits the quantity of air to be distributed between the nozzles in accordance with the share of the tree and its foliage distribution. For example, in some spraying operations, it may be desirable to increase the penetration of one or the other of the three nozzles, and in such case the throat of one of the nozzles would be opened to its maximum while the blocking plates on the other nozzles would be adjusted to produce restricted throat areas.

The parameters of tractor speed, angle of nutation, and frequency of nutation are determined by the type of spraying (i.e., film or discrete droplets), and the air flow through a nozzle. In actual practice with three nozzles and a compressor producing about 15,000 C.F.M. of air at about 7 inches water pressure in the plenum chamber, a throat velocity of about 55 m/sec. is produced, and the MMD of the emitted droplets is in the range 80–120 microns. Under these conditions, successful experimental film spraying of an oil/water emulsion has been carried out on citrus trees with a nutation frequency of about 60 Hz, and a tractor speed of 1.5 km/hr. The rate of liquid consumption was 800–1000 liters/hr., a ten-fold improvement over conventional systems. These parameters are merely typical of many other combinations that will work equally well. For example, an increase in tractor speed should be accompanied by an increase in nutation frequency and a decrease in nutation angle. Successful experimental discrete droplet spraying of deciduous trees with a pesticide solution has also been carried out with a nutation angle of between 30°–40°, a nutation frequency of about 120 Hz, and a tractor speed of about 3.5–4 km/hr. As in the case of film spraying, these values are typical, and other combinations of values will work equally well.

Conversion of the apparatus from one type of spraying to another (or a change in parameters with a given type of spraying) is facilitated by reason of the connection between link 47 and arm 46 as shown in FIG. 5. Specifically, the arm 46 can be connected at any one of several points on link 47 effectively changing the length of link 47 and resulting in a change in the nutation angle. Changes in the nutation frequency are effected by changing the speed of motors 49 driving links 47, these changes resulting from the rates of flow of hydraulic fluid to the motors.

When three nozzles are used as shown in the drawings for spraying trees, the downwardly directed upper nozzle is effective to reduce "drift," which is the percentage of liquid material that does not deposit on the targets. This is important when poisonous liquids are being sprayed. Finally, with three nozzles, the plenum chamber is preferably hinged at 100 to permit pivoting of the top two sections in the forward direction thus reducing the elevation of the apparatus during transit from one location to another.

To expedite the spraying operation, it is possible to spray one half of each tree on either side of the path traversed by the apparatus. In such case, the modification of the plenum chamber shown in FIG. 6 could be utilized. In this modification, a set of three nozzles is also provided on the leading end wall of the plenum chamber as well as on the trailing end wall. However, the nozzles are oriented so that their throats are open in opposite directions as indicated in FIG. 6. In such case, the compressor 18 will have to be oriented in a different manner than as shown in FIG. 3. Specifically, the axis of the compressor would then be made perpendicular to the direction of travel as shown in FIG. 6 rather than parallel to the direction of travel as indicated in FIG. 3.

We claim:

1. Apparatus for spraying trees and especially citrus trees comprising a mobile source of pressurized air adapted to be propelled along a path parallel to a row of trees to be sprayed and including a plenum chamber for maintaining a generally constant air pressure there-within during operation; at least one nozzle connected to said plenum chamber and having a throat in the form of a vertically oriented slit producing a substantially continuous sheet-like air blast whose principle plane is substantially vertically oriented; means associated with the slit for oscillating the principle plane of the air blast back and forth about a substantially vertical axis through such an angle and at such a frequency as to impart an oscillatory movement to the leaf structure within the air blast thereby exposing opposite surfaces of the leaves to the blast; and a sprayhead associated with each nozzle out of the path of the air blast for spraying atomized liquid into the air blast at a location downstream of the throat.

2. Apparatus according to claim 1, including at least two vertically separated nozzles connected to the source of pressurized air, the lowest nozzle being directed slightly upwardly to provide spray coverage to the lower region of the branch structure of the tree, and the highest nozzle being directed slightly downwardly to provide spray coverage to the upper region of the branch structure of the trees.

3. Apparatus according to claim 2, wherein a centrifugal fan is located internally of the plenum chamber for exhausting thereinto.

4. Apparatus according to claim 2, wherein the nozzles are adjustably mounted on the source for pivotal movement about an axis perpendicular to the principle plane of the air blast.

5. Apparatus according to claim 4 including means for imparting pivotal movement to the highest of the nozzles during operation of the apparatus.

6. Apparatus according to claim 1, wherein the means associated with the slit for oscillating the principle plane of the air blast comprises a pair of flaps pivotally mounted on the respective edges of the slit, a link connecting the flaps so that pivotal movement of one imparts pivotal movement to the other, a motor having a rotary output, and means responsive to the rotary output of the motor for imparting an oscillatory movement to the flaps.

7. Apparatus according to claim 6, including a plate mounted on the nozzle having an edge defining the slit and being adjustable on the nozzle for selectively changing the width of the slit.

8. Apparatus according to claim 1, wherein the sprayhead comprises a header tube extending parallel to and in the direction of the slit and attached to the nozzle, and a plurality of individual spray nozzles connected to the header tube.

9. Apparatus according to claim 8, wherein the angular position of the spray nozzle can be selectively adjusted.

10. Apparatus according to claim 1, wherein the mobile source includes a wheeled chassis adapted to be towed by a tractor.

11. Apparatus according to claim 10, including a mobile tank adapted to contain the liquid to be sprayed, a pump for pressurizing the liquid, and conduits for conducting pressurized liquid to the sprayhead.

12. Apparatus according to claim 1 including six nozzles arranged in two banks, the nozzles in each bank being vertically positioned, and the slits in the nozzles in one bank opening the opposite side of the mobile source as the slits in the nozzles in the other bank.

13. Apparatus for spraying foliage comprising:
 a. means for producing a substantially continuous sheet-like blast of air;
 b. means for injecting atomized liquid into the air blast; and
 c. means for varying the direction of the air blast in oscillation motion to thereby impart oscillatory movement to the foliage.

14. Apparatus according to claim 13 wherein the means for producing a sheet-like blast of air includes a nozzle having a throat in the form of a slit, and the means for varying the direction of the air blast includes vane-means associated with the nozzle downstream of the throat for controlling the angular direction of the blast with respect to the principle axis of the nozzle, and means for oscillating the vane-means about the principle axis.

15. Apparatus according to claim 13 wherein the means for injecting atomized liquid into the air blast includes spray nozzle means located out of the effective path of the air-blast for spraying a liquid into the air-blast.

16. Apparatus according to claim 13 and comprising means for selectably determining the frequency of oscillation of the air blast.

17. Apparatus according to claim 13 and comprising means for selectably varying the volume of compressed air in said sheet-like blast of air.

18. Apparatus according to claim 2 and also comprising a middle nozzle directed substantially horizontally to provide spray coverage to the middle region of the branch structure of the trees.

19. A method for spraying foliage comprising the steps of:
 providing compressed air to a plenum chamber for producing a supply of pressurized air under generally uniform pressure;
 supplying air under generally uniform pressure from said plenum chamber to a nozzle for producing a sheet-like blast of air; and
 injecting atomized liquid into the air blast for propelling said liquid onto said foliage.

20. A method according to claim 19 and also comprising the step of varying the direction of said sheet-like blast of air in oscillatory motion, thereby to impart oscillatory movement to the foliage.

21. A method according to claim 19 in which the step of supplying air includes the steps of producing a plurality of sheet-like blasts of air separated from each other along a vertical axis and oriented such that the uppermost blast of air is directed at least partially downwardly onto the foliage of a tree from above and the lowermost blast of air is directed at least partially upwardly onto the foliage of the tree from below.

* * * * *